United States Patent [19]

Teranishi

[11] Patent Number: 4,757,401
[45] Date of Patent: Jul. 12, 1988

[54] CARTRIDGE HANDLING MECHANISM FOR DISK FILE SYSTEM

[75] Inventor: Shunichi Teranishi, Anjo, Japan
[73] Assignee: Aisin Seiki Kabushiki Kaisha, Japan
[21] Appl. No.: 65,736
[22] Filed: Jun. 24, 1987

[30] Foreign Application Priority Data

Jun. 27, 1986 [JP] Japan ............... 61-99566[U]

[51] Int. Cl.$^4$ ............... G11B 17/22; G11B 17/04; B65G 1/20; B65G 65/08
[52] U.S. Cl. ............... 360/98; 369/34; 369/194; 414/280; 414/281
[58] Field of Search ............... 360/98; 369/75.2, 178, 369/191, 192, 194, 34; 414/281, 280, 661

[56] References Cited

U.S. PATENT DOCUMENTS

| 4,504,936 | 3/1985 | Faber et al. | 360/98 |
| 4,614,474 | 9/1986 | Sudo | 360/98 |
| 4,691,309 | 9/1987 | Suzuki | 369/194 |

FOREIGN PATENT DOCUMENTS 59-186168  10/1984  Japan .................. 360/98

Primary Examiner—Robert S. Tupper
Attorney, Agent, or Firm—Sughrue, Mion, Zinn, Macpeak and Seas

[57] ABSTRACT

A cartridge handling mechanism for use in a disk file system having a stocker in which a multiplicity of thin cartridges respectively having disks accommodated therein are respectively accommodated in a multiplicity of accommodating shelves in parallel to each other, a player for writing and reading data onto and from the disk in each cartridge, and a carrier linearly moved along the front side of the stocker. The carrier has a pair of engagement members selectively engaged with a pair of grooves respectively provided in two side end surfaces at one end of each of the cartridges, so that a selected cartridge is drawn out of the stocker by means of the pair of engagement members, moved to a position facing the front side of the player by the operation of the carrier and then pushed out from the carrier and inserted into the player by the action of the engagement members. The pair of engagement members are formed so as to have bisymmetrical configurations in which their respective distal ends are bent inward at substantially right angles and each of the bent portions has a convex outer surface. Accordingly, a selected cartridge is directly pushed into the player by means of the engagement members and allowed to drop so as to be set in the player without being caught by a surface thereof which is in contact with the engagement members.

1 Claim, 3 Drawing Sheets

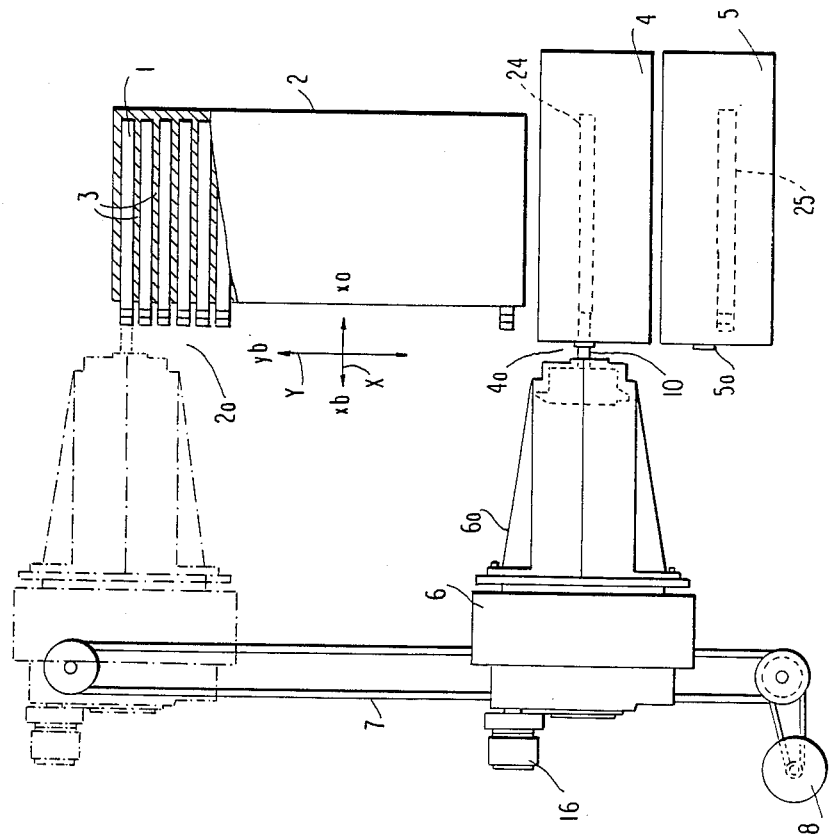
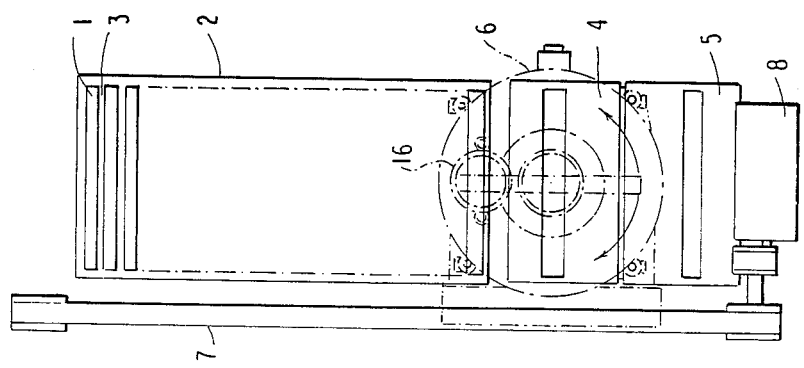

CARTRIDGE HANDLING MECHANISM FOR DISK FILE SYSTEM

BACKGROUND OF THE INVENTION

1. Field of the Invention

The present invention relates to a cartridge handling mechanism for use in a disk file system to tansfer a cartridge between a player and a carrier and between a stocke and the carrier.

2. Description of the Related Art

A prior art related to the present invention is disclosed in the specification of Japanese patent Laid-Open No. 60-261065 (1985).

The disclosed prior art is a device arranged such that a multiplicity of thin cartridges respectively having disks accommodated therein are automatically transferred between a stocker and a player. More specifically, a multiplicity of cartridges each having grooves respectively formed in both side surfaces thereof are accommodated in a stocker in a state wherein the grooves extend paralel to the direction of movement of a carrier having a means for moving engagement members adapted to draw out or push in a cartridge in the horizontal direction. A player has a device provided near a cartridge inserting and discharging port, the device being adapted to enable positioning grooves and the engagement members to be engaged with each other so that, when a cartridge is inserted into or discharged from the player, the grooves formed on the cartridge and cartridge grooves formed in the player are coincident with each other on straight lines, respectively. The cartridge which has been inserted into the player by the action of the engagement members is pushed out therein to a predetermined position by the operation of the above-described device and then automatically loaded by the operation of a motor provided on the player. When the cartridge is to be discharged, it is automatically ejected and held at a position where it is engaged with the engagement members by the operation of the above-described device.

The above-described prior art includes one type of system which has no automatic cartridge loading device on the player side, that is, the type in which a cartridge is externally pushed into the player. This type of system needs to additionally provide a device having a cartridge pushing means in order to use a player. Accordingly, the production cost is disadvantageously raised by the addition of such a device.

SUMMARY OF THE INVENTION

In view of these circumstances, it is a primary object of the present invention to provide a cartridge handling mechanism which enables a player to be used in a system having no automatic cartridge loading device.

To this end, according to the present invention, the pair of engagement members provided on the carrier are formed so as to have bisymmetrical configrations in which their respective distal end portions are bent inward at substantially right angles and a convex outer surface is formed on each of the bent end portions, thereby minimizing the contact resistance occurring between the engagement members and the grooves formed in the side surfaces of each cartridge.

The engagement members having the above-described configurations enable a cartridge to be directly pushed and set into a player.

At this time, a carriage provided in the player receives the cartridge and is dropped directly below so that the cartridge is set in the player by the action of resilient force from spring means without being caught by the surface of the cartridge which is in contact with the engagement members.

The above and other objects, features and advantages of the present invention will become more apparent from the following description of the preferred embodiment thereof taken in conjunction with the accompanying drawings.

BRIEF DESCRIPTION OF THE DRAWINGS

FIG. 1 is a front view of disk file system to which one embodiment of the present invention is applied;

FIG. 2 is a side view of the system illustrated in FIG. 1;

DESCRIPTION OF THE PREFERRED EMBODIMENT

Figure 3:
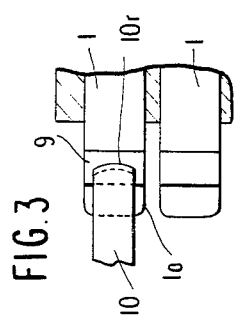
FIG. 3 is an enlarged side view of an engagement member according to the present invention.

One embodiment of the present invention will be described hereinunder in detail with reference to the accompanying drawings.

Referring to FIGS. 1 and 2, each of the cartridges 1 accommodates a disk (not shown) serving as a recording medium.

A stocker 2 has a longitudinally extended configuration and is disposed in such a manner that the longitudinal axis extends vertically. A multiplicity of horizontal accommodating shelves 3 are provided in the stocker 3 in parallel to each other in the vertical direction so that a multiplicity of cartridges 1 can be horizontally accommodated in spaces defined within the shelves 3, respectively, in such a manner that the cartridges 1 are disposed parallel to each other.

Players 4 and 5 are disposed below the stocker 2 to write and read data on and from the disk accommodated in each cartridge 1.

A carrier 6 selectively draws out the cartridges 1 from the stocker 2 and selectively feeds them into the players 4 and 5. The carrier 6 is arranged so that it is linearly moved vertically, i.e., in the direction of the arrow Y, along the respective front sides 2a, 4a and 5a of the stocker 2 and the players 4 and 5. The carrier 6 is moved by a means which is arranged such that a vertically stretched timing belt 7 which is disposed on the left-hand side as viewed in the figures is activated to rotate by the operation of a motor 8, thus causing the carrier 6 to move vertically, i.e., in the direction of the arrow Y, while being guided by a pair of right and left vertically extending guide shafts (not shown) in such a manner that the carrier 6 is maintained in a horizontally disposed state.

Figure 4:
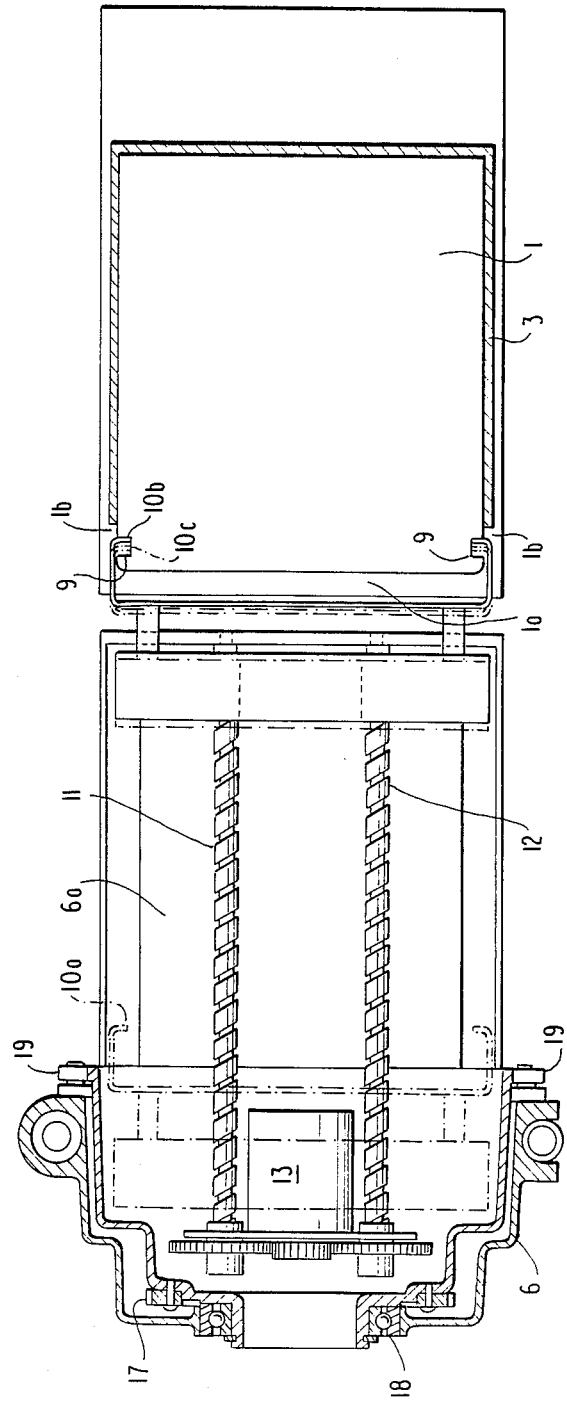
FIG. 4 is an enlarged plan view of an essential part of the disk file system.

Referring next to FIGS. 3 and 4, a pair of grooves 9 are provided in both lateral sides 1b, respectively, at one end 1a of each cartridge 1, and a pair of engagement members 10 which are selectively enagaged with the grooves 9 are provided on the carrier 6.

The engagement members 10 have bisymmetrical configurations in which the respective distal end portion of the enagement members 10 are bent inwardly at substantially right angles to define bent portions 10r which have convex outer surfaces, respectively. The engagement members 10 are moved horizontally, i.e., in a direction (the direction of the arrow X) perpendicular to the carrier moving direction (the direction of the arrow Y).

The engagement members 10 are moved by a means which is arranged such that two screw shafts 11 and 12 are driven to rotate by the operation of a motor 13, thus causing the engagement members 10 to move horizontally.

Figure 5:
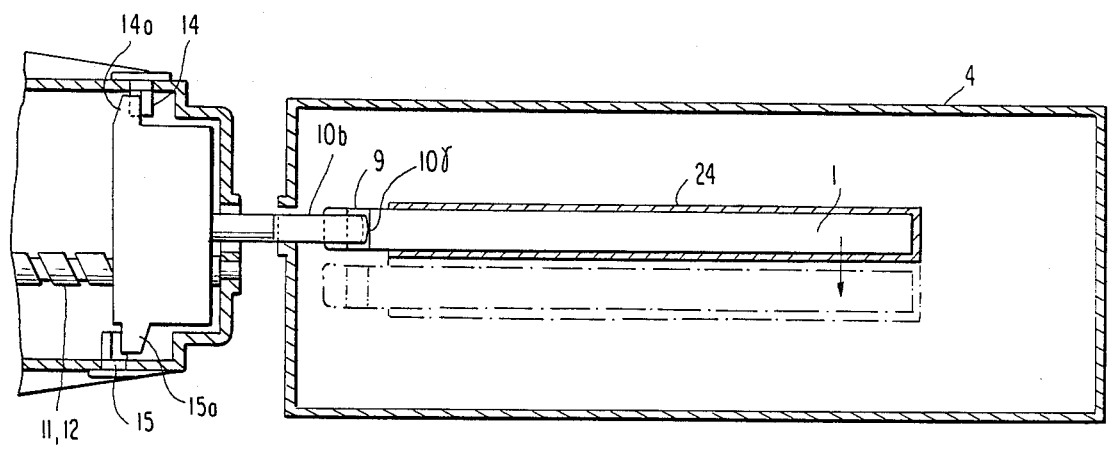
FIG. 5 shows an essential part of the disk file system immediately before a cartridge pushed into a player is dropped therein.
Figure 6:
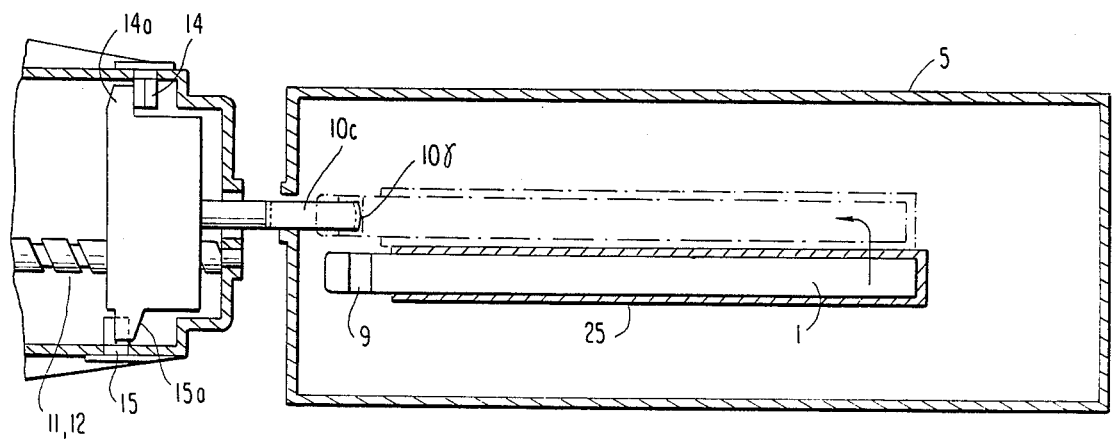
FIG. 6 shows an essential part of the disk file system immediately before a cartridge used in a player is engaged with the engagement members.

The engagement members 10 are stopped at three positions shown in FIGS. 4 to 6, that is, a position 10a which is reached when the cartridge 1 is drawn into the carrier 6, a position 10b at which a carriage 24 provided in the player 4 is mechanically lowered, and a position 10c where the cartridge 1 waits for a carriage 25 provided in the player 5 to be ejected mechanically. At the positions 10b and 10c of the engagement members 10, sensors 14 and 15 face shielding portions 14a and 15a, respectively. At the position 10a also, a similar sensor (not shown) faces the shielding portion 15a.

With the above-described arrangement, when the carrier 6 is stopped at a predetermined position after retrieving a designated cartridge 1, the engagement members 10 provided on the carrier 6 draw in the cartridge 1 to the position 10a shown in FIG. 4, and the carrier 6 is then moved vertically (in the direction of the arrow Ya). When the carrier 6 is stopped at a position facing the player 4, the engagement members 10 on the carrier 6 are pushed out horizontally (in the direction of the arrow Xa), so that the cartridge 1 is fed into the carriage 24 provided in the player 4 and pushed in until the predetermined position 10b is reached. At this time, the engagement members 10 are in contact with the walls of the grooves provided in the lateral sides 1b of the cartridge 1. Then, the cartrige 1, together with the carriage 24, drops so as to be set in the player 4 smoothly by virtue of the convex surface 10r formed at the distal end of each of the engagement members 10. Then, data written on the disk in the cartridge 1 is read.

To remove a cartridge 1 which has been fed into the player 5 and already used, the carrier 6 is moved vertically (in the direction of the arrow Ya) in a state wherein the engagement members 10 are drawn in to the position 10a, and stopped at a position facing the player 5. Then, the engagement members 10 are moved horizontally (in the direction of the arrow Xa) to the position 10c. Thereupon, the used cartridge 1 standing by is moved upward by the carriage 25 of the player 5 so as to be engaged with the engagement members 10. Then, the engagement members 10 are moved horizontally (in the direction of the arrow Xb), so that the engagement members 10 engaged with the cartridge 1 are drawn into the carrier 6 to the position 10a. The carrier 6 is then moved vertically (in the direction of the arrow Yb) to the position of the former accommodating shelf 3 in the stocker 2 to which the used cartridge 1 is to be returned. Thereafter, the engagement members 10 are pushed out horizontally (in the direction of the arrow Xa), thus causing the used cartridge 1 to be pushed back into the former accommodating shelf 3 in the stocker 2 so as to be accommodated therein.

Since the disk accommodated in each cartridge 1 can be used at both sides, i.e., the side A and the side B, the carrier 6 may be turned 180° after receiving a cartridge 1 to select a desired side, as shown in FIG. 1.

The means for turning the carrier 6 is, as shown in FIGS. 1, 2 and 4, arranged such that a cartridge accommodating portion 6a of the carrier 6 is inverted through bearing portions 18 and 19 by the operation of a motor 16 and through a gear 17.

As has been described above, the present invention enables a cartridge to be directly pushed into a carriage in a player by virtue of a convex outer surface formed on the bent end portion of each engagement member. Accordingly, it is unnecessary to provide a device having a push means as in the prior art and it is therefore possible to use an inexpensive player and hence to reduce the production cost of a disk file system.

Accordingly, it is unnecessary to employ a player exclusively used for an autochanger, and a manually-operated player can also readily be mounted in the system and can be used for an autochanger.

Although the present invention has been described through specific terms, it should be noted here that the described embodiment is not necessarily exclusive and various changes and modifications may be imparted thereto without departing from the scope of the invention which is limited solely by the appended claim.

What is claimed is:

1. In a disk file system having a stocker in which a multiplicity of thin cartridges respectively having disks vertically accommodated therein are respectively accommodated in a multiplicity of accommodating shelves in parallel to each other, a player for writing and reading data, onto and from the disk in each cartridge, and a carrier vertically and linearly moved along the front side of said stocker, wherein the respective distal ends of a pair of engagement members provided on said carrier are selectively engaged with a pair of grooves respectively provided in two side end surfaces at one end of each of said multiplicity of cartridges accomodated in said stocker, so that a selected cartridge is drawn out of said stocker by means of said pair of engagement members, moved to a position facing the front side of said player by the operation of said carrier and then pushed out from said carrier and inserted into said player by the action of said engagement members, a cartridge handling mechanism characterized by forming said pair of engagement members provided on said carrier so that they have bisymmetrical configurations in which their respective distal ends are bent inward at substantially right angles and each of said bent portions has a convex outer surface, whereby a selected cartridge is directly pushed into said player by means of said engagement members and allowed to drop so as to be set in said player without being caught by a surface thereof which is in bontact with said engagement members.

* * * * *